Sept. 1, 1959 W. HAUSMANN 2,902,290
STEERABLE WHEEL SUSPENSION
Filed Nov. 5, 1957
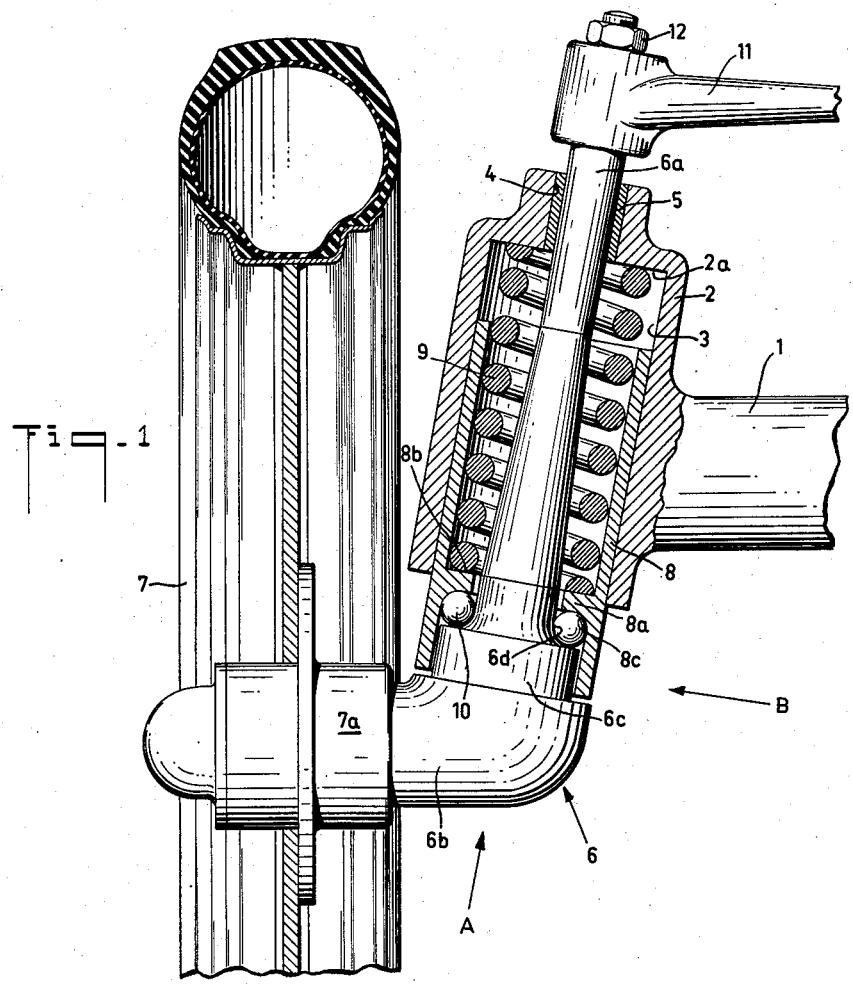
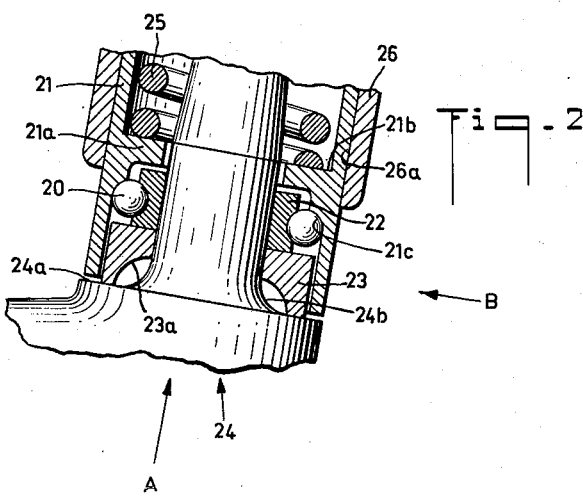
WERNER HAUSMANN
INVENTOR.
BY
AGENT

United States Patent Office 2,902,290
Patented Sept. 1, 1959

2,902,290

STEERABLE WHEEL SUSPENSION

Werner Hausmann, Uthleben, near Nordhausen, Germany, assignor to VEB Schleppermerk Nordhausen, Nordhausen, Germany, a corporation of Germany Application November 5, 1957, Serial No. 694,585

Claims priority, application Germany May 4, 1957

5 Claims. (Cl. 280—96.2)

My present invention relates to independent-wheel-suspension systems, and more particularly to improved bearings for holding steering knuckles in the front axle of an automotive vehicle such as, for example, a tractor.

Known bearings for steering knuckles in front axles for the wheels of the independent-spring-suspension type comprise a rather large number of parts. Such bearings facilitate and control the angular movements of the steering knuckle, which are necessary for the steering of the front wheels, and also permit axial movements of the knuckle. Moreover, the bearings guide and protect the customary cushion spring whose function it is to absorb the shocks developing during the rising and falling movements of the vehicle wheels and to transmit axle loads to the steering knuckle and thereover to the wheels. Such known systems occupy considerable space and require substantial quantities of high-grade metals which materially increase the overall cost of the vehicle.

It is, accordingly, an important object of the instant invention to provide a greatly simplified and durable device of the above character which may be assembled on the front axle with practically no modifications in the latter.

Another object of the invention is to provide an improved mounting for the steering knuckle in the so-called Mercedes or independent-wheel-suspension type of front axle for automotive vehicles which is capable of transmitting forces acting in horizontal and vertical directions on the steering knuckle.

In accordance with a feature of the invention, the bearing comprises a cylindrical sleeve and antifriction rolling elements disposed between an internal abutment of the sleeve and the steering knuckle. The sleeve, which is slidably and preferably also rotatably mounted in a tubular extension of the front axle, thus performs the functions of (a) facilitating the angular movements of the knuckle necessary for the steering of the front wheel, (b) enabling an axial sliding of the knuckle when the latter moves in response to increasing or decreasing loads upon the axle and to the oscillations occurring in the travel of the vehicle over uneven terrain, and (c) guiding and at least partially housing the coil spring. The antifriction rolling elements are inserted between suitably shaped, hardened and polished surfaces on the aforementioned abutment and on the steering knuckle, either directly or with interposition of a single race therefor.

The invention will be described in greater detail with reference to the accompanying drawing in which:

Fig. 1 is a vertical section through the outboard end of a front axle provided with a suspension system embodying the invention; and Fig. 2 is an enlarged fragmentary section through part of a modified system according to the invention.

In Fig. 1 there is shown part of the front axle 1 whose outboard portion is formed into a tubular head 2 defining a cylindrical chamber 3 which terminates in a bore 4 of reduced diameter. Bushing 5, which is seated in the bore 4, slidably and rotatably receives the upper leg 6a of the steering knuckle 6. The latter has a substantially horizontal lower leg 6b rotatably supporting the hub 7a of the front road wheel 7. A cylindrical sleeve 8, which is slidably and rotatably received in the chamber 3, is formed with an internal ring 8a. The customary cushion spring 9 is disposed between the upper face 8b of the ring and the shoulder 2a in the axle head 2. The inner surface of the sleeve 8 beneath the ring 8a is hardened, polished and suitably shaped to define a throat zone 8c which serves for the retention of antifriction balls 10, thus replacing an outer bearing race therefor. A collar 6c, intergral with the steering knuckle 6, is received with very little clearance in the lowermost end of the sleeve 8 to serve as a plug therefor; its upper face is hardened, polished and again suitably shaped to define a second throat zone 6d which replaces an inner race for the balls 10. It will be noted that the radius of curvature of both throat zones 8c and 6d substantially corresponds to the radius of balls 10. The upper leg 6a of the knuckle extends from the bushing 5 and is rigidly fixed to the steering arm 11 by means of a nut 12 engaging its threaded end.

By operating between the shoulder 2a in the axle head and the ring 8a in the sleeve, cushion spring 9 resiliently supports the load borne by the axle 1 and also absorbs any stresses transmitted to it by the knuckle 6 and the sleeve 8 when the wheel oscillates on uneven terrain.

Collar 6c effectively prevents entry of foreign matter into the sleeve 8 as well as loss of lubricant (not shown) from the spring chamber 3 and from the bearing space between throat zones 6d and 8c.

Hardened throat zone 6d also acts to reinforce the knuckle at the point subjected to the severest stresses. The rolling elements 10 between the collar 6c and the ring 8a enable the knuckle to transmit both axial forces (arrow A) or radial forces (arrow B), thus dispensing with the need for separate thrust bearings or journal boxes.

In the modification illustrated in Fig. 2, the balls 20 are held between a hardened and polished throat zone 21c of a sleeve 21 and an inner race 22. Thus, here again the sleeve replaces the outer race for the antifriction rolling elements. An annular plug 23 closes the lower end of sleeve 21 in a manner similar to that of collar 6c shown in Fig. 1. The plug 23 supports the bearing race 22, while resting in turn on a shoulder 24a of steering knuckle 24, and has an internal concave annular groove 23a which accommodates the reinforcing throat portion 24b at the point where the knuckle 24 is subjected to maximum stress. As in Fig. 1, the sleeve 21 is formed with an internal ring 21a whose upper face 21b serves as a lower stop for the cushion spring 25. The sleeve is received in the bore 26a of the axle head 26. The forces acting in the direction of arrows A and B are absorbed and transmitted by the rolling elements 20 in the same manner as described above. The coil spring 25 is securely held and properly guided at all times and loss of lubricant as well as entry of foreign matter is again prevented.

It will thus be seen that I have invented an improved mounting of greatly simplified construction for rotatably and slidably supporting the steering knuckle in the outboard end of an axle for wheels of the independent-suspension type. Despite the omission of a number of parts in comparison with conventional systems, the rolling elements and the sleeve co-operate with the steering knuckle and the cushion spring in such manner that knuckle and spring immediately respond to forces acting either from the road wheel, from the axle or from the steering arm.

The invention is, of course, not limited to the various structural details specifically disclosed herein but may be embodied in numerous modifications and adaptations without departing from the spirit and scope of the appended claims.

I claim:

1. A suspension system for a front wheel of an automotive vehicle, comprising an elbow-shaped steering knuckle having two angularly adjoining legs including an upstanding leg, an axle terminating in a tubular head spacedly surrounding said upstanding leg, said head being formed with an internal shoulder, a cylindrical sleeve slidably received in said head below said shoulder and concentrically surrounding said upstanding leg with clearance, said sleeve being provided with an internal ring spaced from both the upper and the lower end of said sleeve, resilient cushioning means disposed in the space between and bearing upon said ring and said shoulder, a collar on said upstanding leg fittingly received within and substantially closing the lower end of said sleeve, thrust means bridging the clearance between said sleeve and said upstanding leg, said thrust means including a set of antifriction balls disposed between said ring and said collar, thereby transmitting stresses between said steering knuckle and said tubular head while facilitating relative rotation thereof, said upstanding leg having an upper end projecting above said tubular head, and a control link engaging said upper end, said sleeve being internally formed underneath said ring with a hardened and polished concave annular throat zone accommodating said balls, said throat zone having a radius of curvature substantially equal to that of the balls in contact therewith.

2. A system according to claim 1 wherein said thrust means further comprises an inner bearing race embracing said upstanding leg, said balls being held in position jointly by said throat zone and by said bearing race.

3. A system according to claim 1 wherein said throat zone forms a transition between the underside of said ring and an adjacent cylindrical surface of said sleeve.

4. A system according to claim 1 wherein said collar is integral with said upstanding leg.

5. A system according to claim 4 wherein said steering knuckle is formed at the upper surface of said collar with a hardened and polished concave annular throat zone accommodating said balls and forming a transition between said collar and an adjacent cylindrical portion of said upstanding leg, both of said throat zones having substantially the same radius of curvature.

References Cited in the file of this patent

UNITED STATES PATENTS

| | | |
|---|---|---|
| 1,393,004 | Billings | Oct. 11, 1921 |
| 1,542,511 | Lancia | June 16, 1925 |
| 2,257,422 | Maier | Sept. 30, 1941 |
| 2,635,894 | Jackman | Apr. 21, 1953 |

FOREIGN PATENTS

| | | |
|---|---|---|
| 1,076,651 | France | Apr. 21, 1954 |